Dec. 25, 1928.
J. R. PORTER
AERONAUTICAL MACHINE
Filed Aug. 16, 1927
1,696,581
2 Sheets-Sheet 1
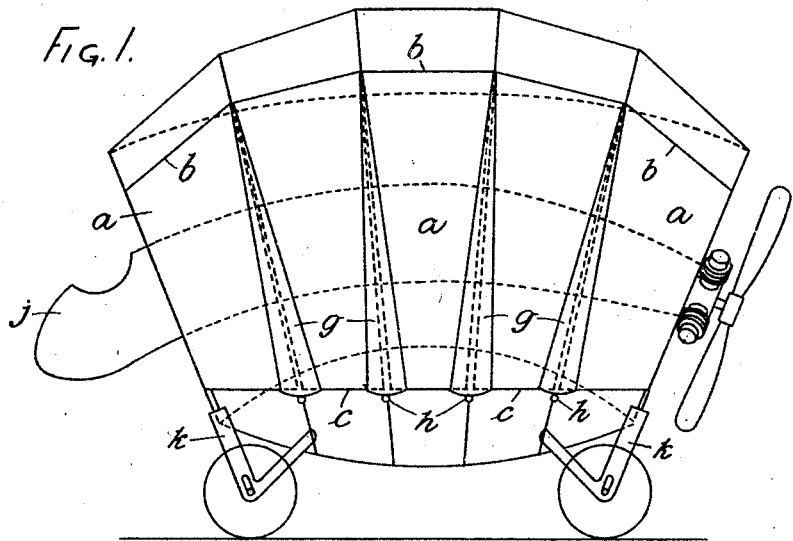
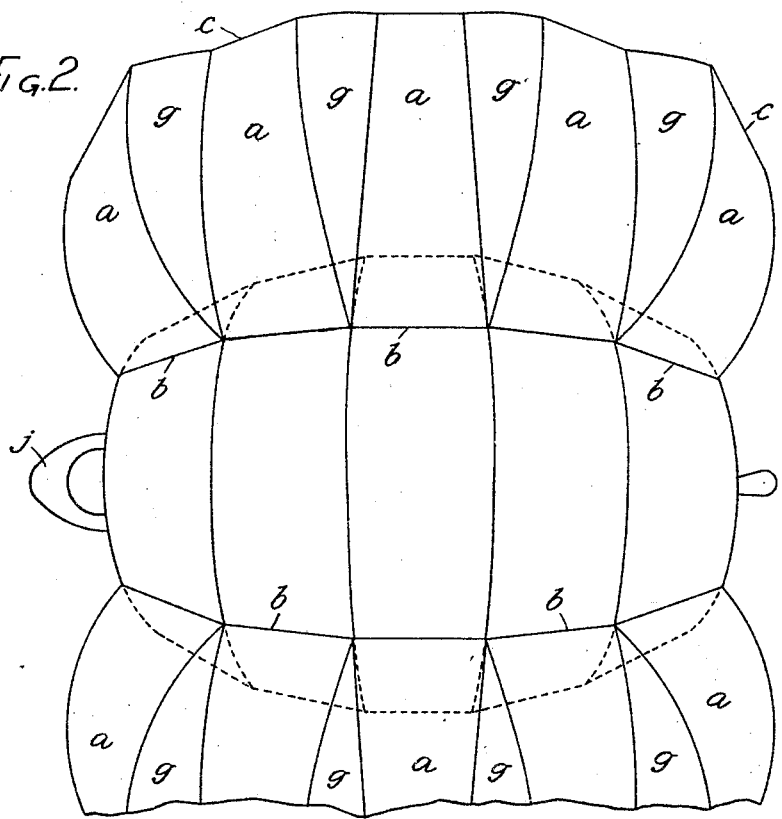
INVENTOR
J. R. Porter Dec. 25, 1928.　　　　　　　　　　　　　　　　1,696,581
J. R. PORTER
AERONAUTICAL MACHINE
Filed Aug. 16, 1927　　　2 Sheets-Sheet 2

INVENTOR
J. R. Porter

Patented Dec. 25, 1928.

1,696,581

UNITED STATES PATENT OFFICE.

JAMES ROBERTSON PORTER, OF WANTAGE, ENGLAND.

AERONAUTICAL MACHINE.

Application filed August 16, 1927, Serial No. 213,239, and in Great Britain December 30, 1926.

The present invention relates to aeronautical machines of the helicopter type having a body with convex sides or circular shape in vertical section and in which oppositely extending parachute surfaces or segments are provided, the said parachute surfaces conforming to the convex shape of the sides of the body and in the closed position either forming the sides of the said body or lying closely thereon.

The said type of machine is to be distinguished from helicopter aeronautical machines having bodies with concave sides provided with hinged ribs or segments connected by interposed sails or segments to form laterally extending parachute surfaces and wherein in moving to the extended position the ribs and segments change from the concave to a convex parachute surface, the outer ends of said segments being connected together by controlling cords.

The said type of machine is also to be distinguished from aeronautical machines of the flapping wing type where the wings which form parachute surfaces on descent are extended against the action of connecting springs, or equivalent.

An aeronautical machine of the type referred to and according to the present invention comprises a body having convex sides or of circular shape in vertical section, in combination with oppositely extending parachute surfaces or segments conforming to the convex shape of the sides of the body part and in the closed position either forming the sides of the said body or lying closely thereon, and means for connecting the oppositely extending parachute surfaces or segments together by rubber or other extensible cords or devices.

The said laterally extending parachute surfaces preferably consist of framed segments having godets or flares, forming part of the parachute surfaces, interposed between and attached to their adjacent edges, the said godets or flares being provided with controlling or releasing cords.

Any suitable number of rubber or extensible cords or devices may be employed according to requirements.

The parachute surfaces may also be adapted to act as aerofoils and help to retain the machine at its elevation at slow speeds.

The invention is particularly applicable to aeronautical machines such as described in my United States Patent No. 1,494,283.

In my United States Patent No. 1,440,242 I have described an aeronautical machine wherein the outer and substantially spherical portion of the aircraft covering is divided into a number of movable segments hinged at their upper ends and secured at their lower ends to cords led to a position near the pilot so that the segments may be released during descent to the extent required to form a parachute.

The accompanying drawings show two constructions of aeronautical machine made in accordance with my United States Patent No. 1,494,283 and having the present invention applied thereto and embodying parachute surfaces.

Fig. 1 is a side elevation of the machine showing the parachute segments in closed position, as when the machine is in flight.

Fig. 2 is a plan showing the parachute segments extended or opened out, as when the machine is descending.

The machine illustrated comprises a body having convex sides and a longitudinal annular channel surrounding a fuselage, the said body, annular channel and fuselage being constructed on a common curved or bent axis.

The said annular channel may be of Venturi shape and the outer body and fuselage may be of streamline formation, all as set out in my said United States Patent No. 1,494,283.

The machine is constructed with annular frames, the exterior covering of which on each side consists of five segmental parachute surfaces $a\ a$, each hinged at the top as at $b\ b$ and extending downwards to $c\ c$. These five parachute segments $a\ a$ are each provided with a supporting frame $a'$ (Fig. 3) and are capable of being expanded or opened out on their hinged ends $b$ to form part of a parachute, the amount of opening being limited by rubber cords $d\ d$.

The central part of each rubber cord $d$ is secured in the central plane of the machine as at $d'$ to the base of the transverse ring frames $e$ of the machine and the outer ends of the said cords $d$ are fastened at convenient points $f\ f$ on the frames $a'$ of the parachute segments $a\ a$, suitable guide pulleys being provided as at $d^2$, when required.

To facilitate the opening of the parachute segments $a\ a$ and also to increase the parachute area, tapered or triangular flared surfaces or godets $g\ g$ are attached between the adjacent edges of the framed parachute segments $a\ a$. Each of the godets or flares $g\ g$ has a ring, swivel or similar device attached to its lower end, as at $h$, to which a cord $i$ (Fig. 3) is fastened, the several cords $i\ i$ being carried by way of the fuselage $j$ to a point near the pilot's seat and so arranged that the several godets or flares $g\ g$ may be simultaneously released.

Figure 4:
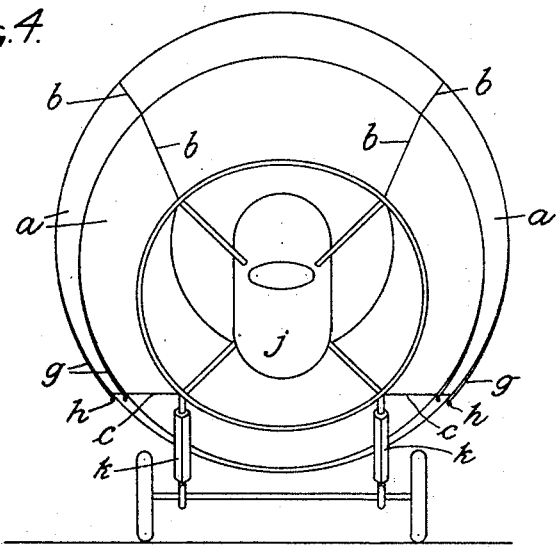
Fig. 4 is an end view of Fig. 1.
Figure 3:
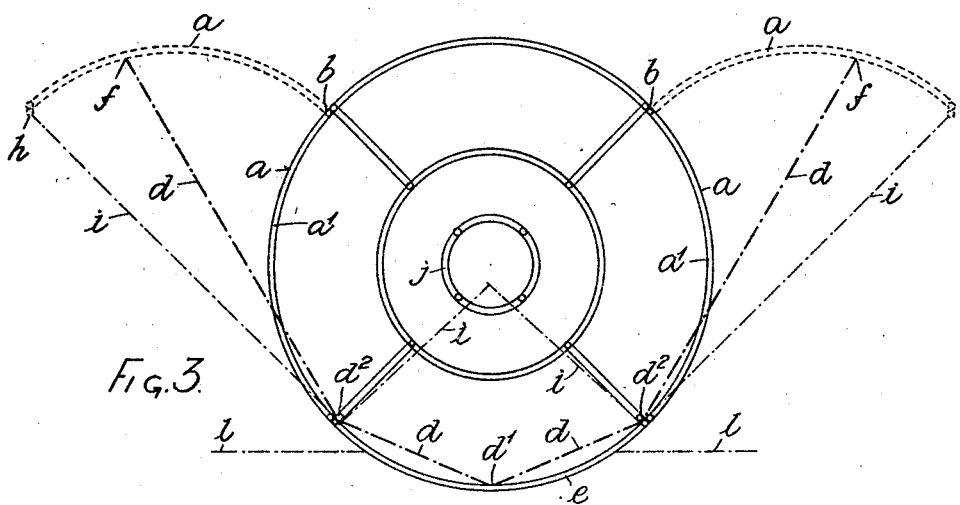
Fig. 3 is a central transverse section.

When the machine is flying the framed parachute segments $a\ a$ and flares or godets $g\ g$ fit closely to the sides of the machine as shown in Figs. 1, 3 and 4, the rubber cords $d\ d$ being just free from tension or having only slight tension.

When the machine begins to fall the controlling cords $i\ i$ are released by hand and the flares or godets $g\ g$ filling with air carry with them the parachute segments $a\ a$ which open out to the position shown in Fig. 2 and in dotted lines in Fig. 3, and stretch the rubber cords $d\ d$ to their full extent, which is about twice their original length, the tension being such that nearly the whole of the weight of the machine is taken by them.

The parachute segments $a\ a$ together with the intervening godets $g\ g$ now form an effective parachute operating to retard the descent of the machine and enable the latter to come down at a safe speed. Further, these parachute surfaces act as aerofoils and help to retain the machine at its elevation at slow speeds.

Upon the machine reaching the surface of the ground the parachute segments being suddenly relieved from air pressure are quickly drawn in by the contraction of the rubber cords $d\ d$ with the result that the quick action of the rubber cords in pulling the parachute segments towards the centre of the machine enables the parachute segments to momentarily support most of the load and materially relieves the under carriage and shock absorbers $k\ k$ from undue pressure, ensuring a safe landing.

In Figure 3 I have indicated by a line $l\ l$ an approximate draught line for the machine when the latter ascends from or descends onto the water.

What I claim as my invention and desire to secure by Letters Patent is:

1. In an aeronautical machine of the type provided with a body having convex sides the combination of oppositely extending parachute surfaces conforming in the closed position to the shape of the sides of the body part, resilient extensible devices connecting the oppositely extending parachute surfaces together, and means for securing said resilient extensible devices in position.

2. In an aeronautical machine of the type provided with a body having convex sides the combination of oppositely extending parachute surfaces conforming in the closed position to the shape of the sides of the body part, rubber devices connecting the oppositely extending parachute surfaces together, and means for securing said rubber devices in position.

3. In an aeronautical machine of the type provided with a body of circular shape in vertical section, the combination of oppositely extending parachute surfaces conforming in the closed position to the shape of the sides of the body part, extensible rubber cords connecting the oppositely extending parachute surfaces to the machine and means for securing said rubber cords in position.

4. In an aeronautical machine of the type provided with a body of circular shape in vertical section, the combination of oppositely extending parachute surfaces conforming in the closed position to the shape of the sides of the body part, extensible rubber cords passing from the oppositely extending parachute surface to the central plane of the machine, and means for securing said rubber cords in position.

5. An aeronautical machine of the kind comprising a body having convex sides and a longitudinal annular channel surrounding a fuselage, the said body annular channel and fuselage being constructed on a common curved axis, in combination with oppositely extending parachute surfaces conforming in the closed position to the shape of the sides of the body part, extensible rubber cords connecting the oppositely extending parachute surfaces to the machine, and means for securing said rubber cords in position.

6. An aeronautical machine of the kind comprising a body having convex sides and a longitudinal Venturi shaped annular channel surrounding a fuselage, the said body, Venturi shaped annular channel and fuselage being constructed on a common curved axis in combination with oppositely extending parachute surfaces conforming in the closed position to the shape of the sides of the body part, extensible rubber cords connecting the oppositely extending parachute surfaces to the machine, and means for securing said rubber cords in position.

7. An aeronautical machine of the kind comprising a body having convex sides and a longitudinal Venturi shaped annular channel surrounding a fuselage, the said body, Venturi shaped annular channel and fuselage being of streamline formation and constructed on a common curved axis in combination with oppositely extending parachute surfaces conforming in the closed position to the shape of the sides of the body part, extensible rubber cords connecting the oppositely extending parachute surfaces to the machine, and means for securing said rubber cords in position.

8. An aeronautical machine of the kind comprising a body having convex sides and a longitudinal Venturi shaped annular channel surrounding a fuselage, the said body Venturi shaped annular channel and fuselage being of streamline formation and constructed on a common curved axis, and at least one radial passage being provided leading from the fuselage to the outer body in combination with oppositely extending parachute surfaces conforming in the closed position to the shape of the sides of the body part, extensible rubber cords connecting the oppositely extending parachute surfaces to the machine, and means for securing said rubber cords in position.

9. An aeronautical machine of the kind comprising a body having convex sides and a longitudinal annular channel surrounding a fuselage, the said body, annular channel and fuselage being constructed on a common bent axis, in combination with oppositely extending parachute surfaces forming in the closed position the sides of the body part, extensible rubber cords connecting the oppositely extending parachute surfaces to the machine, and means for securing said rubber cords in position.

10. An aeronautical machine of the kind comprising a body having convex sides and a longitudinal Venturi shaped annular channel surrounding a fuselage, the said body, Venturi shaped annular channel, and fuselage being constructed on a common bent axis in combination with oppositely extending parachute surfaces forming in the closed position the sides of the body part, extensible rubber cords connecting the oppositely extending parachute surfaces to the machine, and means for securing said rubber cords in position.

JAMES ROBERTSON PORTER.